(12) United States Patent
Bair, III et al.

(10) Patent No.: US 7,433,890 B2
(45) Date of Patent: Oct. 7, 2008

(54) METHOD AND APPARATUS FOR STORING AND RETRIEVING DATA STORED WITHIN AN ASSOCIATED PIECE OF EQUIPMENT

(75) Inventors: Richard H. Bair, III, Weaverville, NC (US); Bryan M. Elwood, Candler, NC (US); Walter J. Tipton, Asheville, NC (US); Ronald W. Luyckx, Burnsville, NC (US)

(73) Assignee: Thermo Fisher Scientific Inc., Waltham, MA (US)

( * ) Notice: Subject to any disclaimer, the term of this patent is extended or adjusted under 35 U.S.C. 154(b) by 89 days.

(21) Appl. No.: 10/237,979

(22) Filed: Sep. 10, 2002

(65) Prior Publication Data

US 2004/0049508 A1  Mar. 11, 2004

(51) Int. Cl.
*G06F 17/30* (2006.01)
*G06F 15/16* (2006.01)
*F25B 41/04* (2006.01)

(52) U.S. Cl. .................. 707/104.1; 707/9; 707/202; 709/208; 700/108; 62/127; 62/227

(58) Field of Classification Search ................. 707/205, 707/200, 10, 101, 102, 104.1, 202, 204, 9; 235/487; 345/835; 700/108; 709/208; 62/127, 62/132, 225, 227; 701/35; 714/37
See application file for complete search history.

(56) References Cited

U.S. PATENT DOCUMENTS

| | | | | |
|---|---|---|---|---|
| 5,848,365 | A * | 12/1998 | Coverdill | 701/35 |
| 6,006,344 | A * | 12/1999 | Bell, Jr. | 714/37 |
| 6,038,612 | A * | 3/2000 | Liow | 710/1 |
| 6,434,512 | B1 * | 8/2002 | Discenzo | 702/184 |
| 6,437,692 | B1 * | 8/2002 | Petite et al. | 340/540 |
| 6,647,735 | B2 * | 11/2003 | Street et al. | 62/132 |
| 6,748,755 | B2 * | 6/2004 | Kubo et al. | 62/225 |
| 6,892,546 | B2 * | 5/2005 | Singh et al. | 62/127 |
| 2002/0145632 | A1 * | 10/2002 | Shmueli et al. | 345/835 |
| 2004/0044708 | A1 * | 3/2004 | Linke et al. | 707/205 |
| 2004/0046033 | A1 * | 3/2004 | Kolodziej et al. | 235/487 |

* cited by examiner

*Primary Examiner*—Shahid A Alam
(74) *Attorney, Agent, or Firm*—Baker & Hostetler LLP

(57) ABSTRACT

A method and apparatus that includes a storage device for securing data about an apparatus. The data is stored in a central location and can be accessed or written based upon privileges granted by a processor.

30 Claims, 4 Drawing Sheets

METHOD AND APPARATUS FOR STORING AND RETRIEVING DATA STORED WITHIN AN ASSOCIATED PIECE OF EQUIPMENT

FIELD OF THE INVENTION

The present invention relates generally to data storage and retrieval. More particularly, the present invention relates to remotely storing and retrieving test and informational data within equipment.

BACKGROUND OF THE INVENTION

Mechanical devices, such as household appliances and large commercial devices such as incubators, need to arrive at the customer with a plethora of information. The data can include model and serial numbers, voltage ratings and testing procedures. This data, in order to be helpful, needs to be retained in a safe and secure place. However, with current information retention systems, the information is easily lost or misplaced.

Prior art solutions to this problem have included placing labels on the device. The information that resides on the label usually includes serial and model numbers, voltages, current ratings along with additional information. However, other types of information are not easily tagged with a label. One such piece of information is maintenance history. To further complicate matters, labels on some mechanical devices are not placed in the same location on each and every device. Therefore, it is possible for a person to overlook information that might be contained thereon. Eventually the labels have a tendency to fall off the device or become destroyed. It is even possible that the ink that places the data on the label runs or rubs off when it comes in contact with some type of liquid solution.

To combat some of the above problems, the self-adhesive labels were replaced with metal tags to which the information is stored. However, the tags can be dislocated from the device as well. Another downside to these metal tags is that they are more expensive than the self-adhesive labels.

Another solution to include the information with the device is to attach paper documents to the device itself. In some instances, these information guides are placed in a folder, which itself is attached to the device. However, the same problem that plagues the labels plagues this solution as well. The document, like the labels, are easily lost or misplaced.

These devices, themselves, from time to time fail and are in the need of repair. Current practices have been to call someone familiar with the product and have them diagnose and repair the problem. However, for some problems, the repairperson is similar to a doctor in that he must begin to gather relevant facts to aid determining the problem. With certain types of equipment, the repairperson must be familiar with it in order to solve the problem. Furthermore, the repairperson is usually only armed with a digital multimeter to aid in diagnosing the problem. A person unfamiliar with the product would need the instruction manual along with the digital multimeter to begin to diagnose the problems.

Other difficulties are initial and on-going, calibration of the equipment to specific parameters. The equipment has to be maintained to run at the correct temperature, sensor and battery levels. The prior art maintained the settings with individual switches where the setting could be adjusted. However, the switches are located in a multitude a locations on the mechanical device.

Therefore, a need exists to provide an apparatus or method for storing and retrieving this information in a fast and efficient manner. There is a further need to store this information in a secured central location. Accordingly, it is desirable to provide this method and apparatus through the use of a processor, memory and remote receive and send capabilities such as infrared.

SUMMARY OF THE INVENTION

It is therefore a feature and advantage of the present invention to provide a method and apparatus for accessing data stored in equipment.

It is another feature and advantage of the present invention to provide a method and apparatus for storing data on a storage device linked to equipment.

The above and other features and advantages are achieved through the use of a novel storage device linked to a transmitter and receiver as herein disclosed. In accordance with one embodiment of the present invention, a piece of equipment includes a storage device. Data pertaining to the equipment is stored on the storage device. The present invention further includes a processor that is linked to the storage device, a remote receiver and a remote transmitter.

An example of the storage device is non-volatile memory that is linked through a microprocessor. Located on the non-volatile memory is data such as quality control and manufacturing tests information. The data can also include serial and model numbers.

In accordance with another embodiment of the present invention, an apparatus includes a storage device wherein data about the mechanical apparatus is stored and a remote access that allows a requestor to retrieve the data contained on the storage device. The storage device can be non-volatile memory in which informational and test data is stored and retrieved by authorized personnel. The remote access includes the use of wireless technology such as infrared and BLUETOOTH™.

In another aspect of the invention, a method is provided for processing a remote signal to access and retrieve data from a piece of equipment, which includes the steps of storing data on a storage device linked to the equipment, retrieving the data from the storage device upon the reception of a remote retrieve signal and remotely transmitting the data. Further steps to this method are securing the data stored on the storage device, storing data within the storage device upon the reception of a remote storage signal and linking the storage device to a remote location. The method also provides a step whereby the user can access and alter the data from a remote location.

In another aspect of the present invention, an apparatus for processing a remote signal to access and retrieve data from a piece of equipment includes means for storing data that is linked to the equipment, means for retrieving the data from the means for storing upon the reception of a remote retrieve signal and means for remotely transmitting the data. The apparatus can further include means for securing the data stored on the means for storing data by granting read and write privileges to the means for storing data.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

A problem with the previous solutions to the storage of information on equipment is that after even short or extended periods of time, this information can be become dislodged or detached from the apparatus. In other words, persons seeking this information are not able to identify the information by mere inspection of the device. Such a situation can result in the repairperson having to test the apparatus to determine such information. Such a delay can be costly to a business that depends on the apparatus.

A preferred embodiment of the present invention provides an internal storage area in an apparatus where information is stored and retrieved with a wireless device.

An example of the present embodiment is incorporating it into an ultra-low temperature refrigerator (ULT) or an incubator. At manufacture time, the ULT is coded externally with differing types of information. The information can include the serial and manufacturer number, voltage, current information, refrigerant types, dates, model numbers and so on and so forth. The information is used to aid either the owner or repairman. Correct identification of this information is used by either party in assessing such things as maintenance procedures. The wrong information can lead to damaging of equipment, which in turn could be greater in scale than the original problems.

Figure 1:
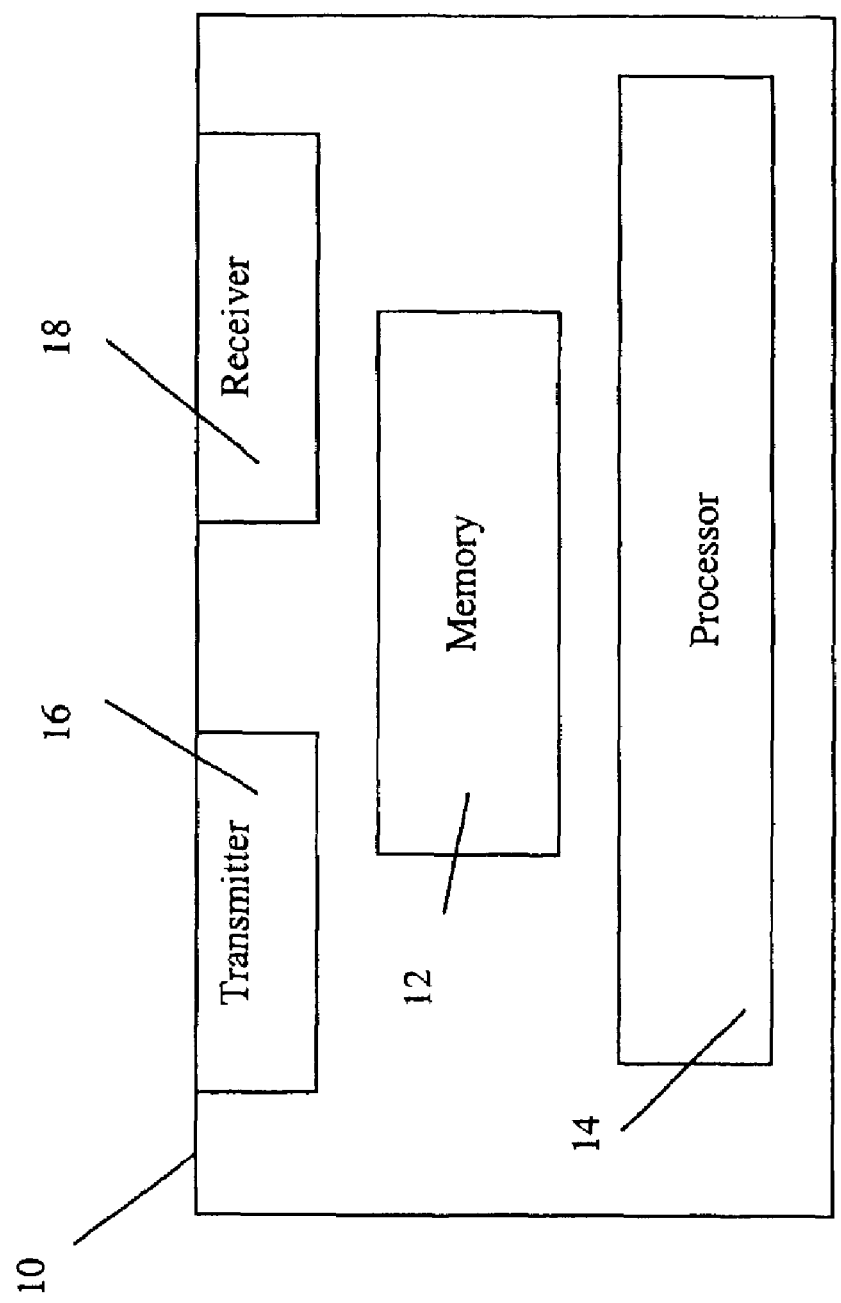
FIG. 1 is a block diagram of a preferred embodiment of the present invention.

A preferred embodiment of the present inventive apparatus and method is illustrated in FIG. 1. The apparatus 10 includes a storage area such as nonvolatile memory 12. Linked to the memory 12 is a processor 14. The processor 14 receives data and stores or retrieves data from the memory 12. In the preferred embodiment, the apparatus 10 includes a transmitter 16 and a receiver 18. The transmitter 16 and receiver 18 serve as the link for the ability to store and retrieve data.

The preferred embodiment solves the prior art problems by storing the data information internally to the apparatus 10. The ULT, a mechanical electrical device, has an electronic device that allows the information to be stored and retrieved by authorized individuals. The ULT has a central processor 14 that carries on a number of functions. The processor 14 is programmed to operate the ULT in a manner desired by the user. The processor maintains desired refrigeration levels, alerting the appropriate personal to specific problems as well as a number of different functions. In the present embodiment, the processor 14 is linked to the memory 12. The memory 12 serves as the location to where such information is stored.

The memory 12 can be initially cleared or preprogrammed with the information. The memory 12 can be an NVRAM that is stored with the information prior to insertion into the device 10. Additionally, the memory 12 can be inserted without any information stored. At this point, the memory 12 can be stored with data either through commands from a wireless or wired device.

In the preferred embodiment, the information is initially stored with a wireless device such as with infrared technology. With the use of a wireless device, the data is received through the receiver 18 and executed by the processor 14. The received data either instructs the processor 14 to retrieve data or store data in the memory 12.

The preferred embodiment does incorporate the use of infrared technology. One of ordinary skill in the art recognizes that other wireless technologies, such as BLUETOOTH™ and radio frequency (RF) are within the scope of this invention. Infrared transmission is incorporated in the present invention due to its wide use in such things as laptop computers, digital assistants and printers.

In the instance of the initial set-up at the manufacturer's site, the data can be stored via a wired device. The wired device is linked with the processor 14 through an external port, i.e. USB, parallel, serial port. Once linked to the processor 14 through a communications protocol, the wired device begins to instruct the processor 14 to store specific data to the memory 12.

Once the data is placed in the memory 12, the data can be protected to limit access to the data and/or write protected to prevent it from being overwritten. In the present embodiment, the processor 14 includes firmware that allows an administrator to limit access to the data as well to write or store data to the memory 12. In the preferred embodiment, only the authorized individual is allowed to read and write data to the memory 12. All non-authorized individuals are only granted read privileges.

The memory 12 can also be load with preprogrammed diagnostic capabilities. The diagnostic tests are then retrieved by the processor 14 and executed. The diagnostic tests are such things as ascertaining the current temperature readings of any of a number of temperature sensors, battery or central processing unit testing. In the instance of the sensor, the memory 14 is loaded with executable code that instructs the processor 14 to take a voltage reading of the one of the sensors. The voltage reading is then made available to the user as a reading in volts or temperature, which would be in Fahrenheit or Celsius. For the temperature readings, an analog to digital converter converts the voltage reading to a temperature reading.

Other diagnostic capabilities are reviewing relay and CPU readings. With relays readings, the processor 14, through the executable code in the memory 12, can monitor the relay of the refrigerant compressor, lights, fans, pan heater and the defrost heater. In each of these instances, the processor reports back to the user that the relay is either ON or OFF. Furthermore, the user is able to toggle the relay through its remote communication device such as a personal digital assistant (PDA). Though a selection option on the PDA, the user instructs the processor to toggle the relay in the manner the user desires.

Figure 2:
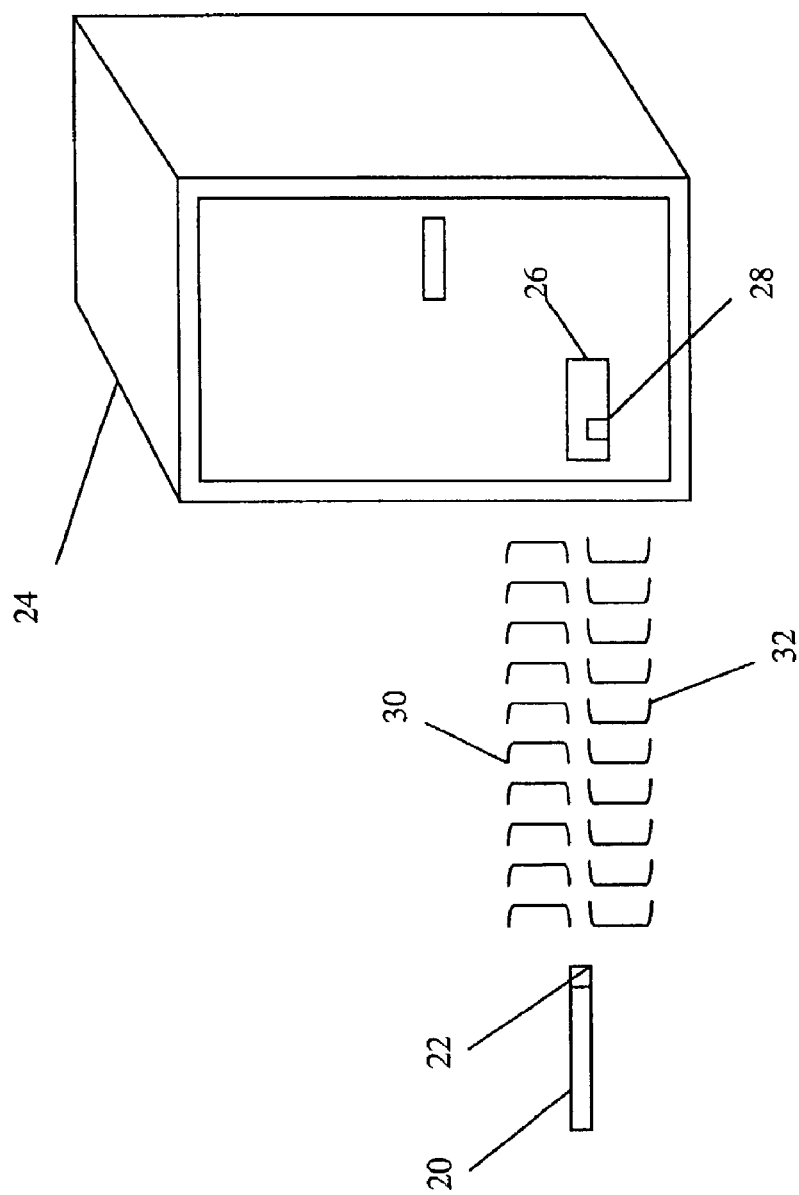
FIG. 2 is an illustration of the preferred embodiment in use with a digital assistant.

FIG. 2 is an illustration of the preferred embodiment in use with a piece of equipment. In the preferred embodiment, an accessor of the memory 12 uses a PDA 20 with an infrared port 22 that includes both a transmitter 16 and receiver 18 to access the memory 14. The PDA 20 initiates a communications session with the equipment 24. Specifically, the equipment 24 includes an external bus 26, which contains an infrared port 28. The PDA 20 through its infrared port 22 transmits data on infrared wavelengths 30 to the equipment 24. The infrared port 28 on the equipment 24 detects the wavelength through a receiver and begins to process the data.

The PDA 20 contains executable code, communications software, that enables the user to access information. Upon sending the data, the processor 14 of the equipment 24 begins to process the request. If the user is authorized to access the data contained in the memory 12, the data is transmitted back via infrared wavelengths 32 to the PDA 20, where it is displayed for the user.

In the preferred embodiment, the processor 14 is programmed to allow differing levels of access. As long as the user is able to initiate a communications session with the processor 14, certain basic information is available, such as the manufacturer and serial number and the voltage rating. Other more sensitive information would require the user be given access by the processor 14 by entering a security code. This other information could be maintenance history, refrigerant and oil types, test data and so on. The information being secured is dependent upon the owner's desires. It is possible to secure all information stored on the memory 12 such that any access to the memory 12 via the processor 14 requires the entry of a security code. However, in the preferred embodiment, certain basic information is available to those able to initiate a communication session with the processor 14.

Additionally, the processor 14 is enabled to write information to the memory 12. After initial information is stored on the memory 12, the processor 14 is programmed to write additional data to the memory 12 as long as there is sufficient space in the memory 12. In the preferred embodiment, the writing privilege is limited to the administrator. The administrator can, over time, write information to the memory 12 that he deems necessary. This could be repair information, part numbers or a history of all maintenance performed on the machine to date. Though not on the preferred embodiment, it is possible to allow a second level of access that would give a mechanic or repairman the ability to enter current repair work being performed.

The portability of this data makes it ideal for the manufacturer. Certified technicians could report this information back to the manufacturer of the equipment, who in turn could use it for a variety of purposes. Such purposes could be warranty and product design and potential problem areas with internal components that could be resolved quickly and efficiently.

Figure 3:
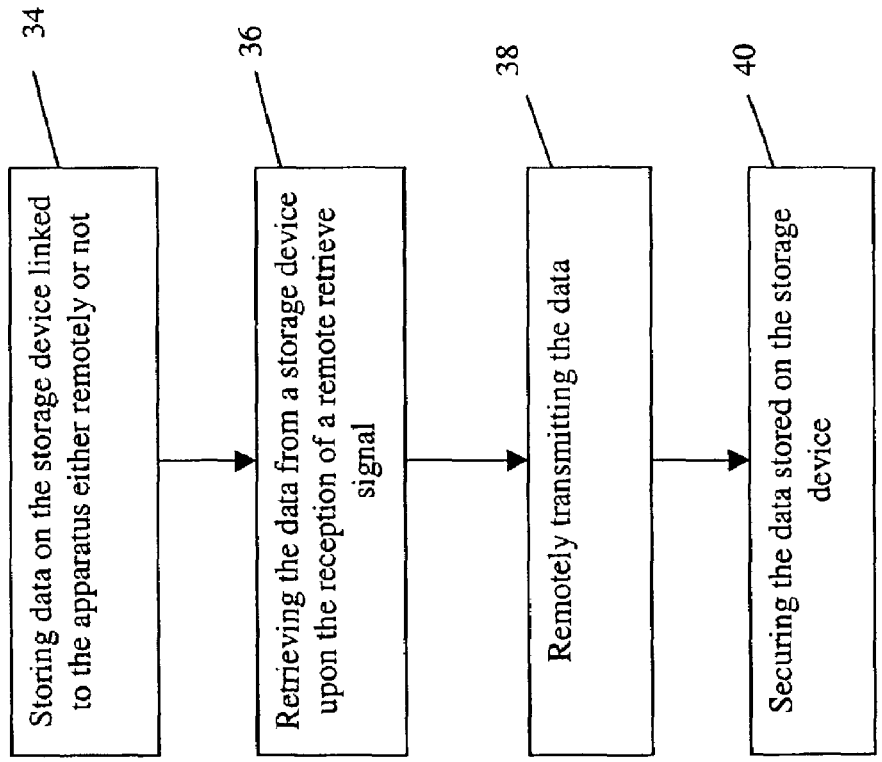
FIG. 3 is a flowchart illustrating the steps that may be followed in accordance with one embodiment of the present inventive method or process.

FIG. 3 is a flowchart illustrating the steps that may be followed in accordance with one embodiment of the present inventive method or process. In this alternate embodiment, data is stored in the memory 12 through the step of storing 34. The step of storing 34 can include storing initial data through a wireless device or a wired device. In using a wireless device, the data is stored by first accessing the memory 12 through the processor 14. The processor 14 processes the storage request upon its reception from an infrared receiver 18. If the memory 12 is write protected, the processor 14 ensures that the requestor has the necessary abilities in order to proceed with the request.

In the step of storing 34 data to the memory 12, a wired device can also be used as well. This alternate embodiment only uses a wired device to store basic information at the time of manufacturer. However, access to the memory 12 is possible through both a wired and wireless device. The apparatus 24 would have to have a communications port, USB or serial, to allow the memory 12 to be accessed.

The information, stored to the device, is also able to be retrieved. The step of retrieving 36 is accomplished by the reception of a remote retrieve signal. The infrared port receiver 18 detects an infrared signal and begins to initiate a communications session. In this alternate embodiment, the processor 14, before allowing access to the memory 12, determines if the requester has sufficient privileges to access any of the information. The processor 14 is initially programmed to allow the most basic information to be retrieved. However, to retrieve maintenance history and warranty information, the accessor will need to enter a security code to retrieve this level of information.

If the processor 14 determines the requester has sufficient privileges to access information, the processor 14 through the step of retrieving 38 gathers the requested information and transmits it to the requester. The infrared wavelengths are used as a carrier to transmit the data to the remote location.

The final step of securing 40 data on the memory 12 is achieved by granting levels of access to a requester. It is possible not to secure any of the information stored on the memory 14. However, this would mean that anyone with the ability to access to the data would be able to overwrite it, which would have the effect of losing vital information. Therefore, in this alternate embodiment, the processor 14, through firmware, is programmed to grant various levels of access to the information stored on the memory 12. In most instances, a requestor is only granted read privileges to the data. In more rare instances, the requester is given write privileges but not the ability to overwrite existing data contained therein.

Figure 4:
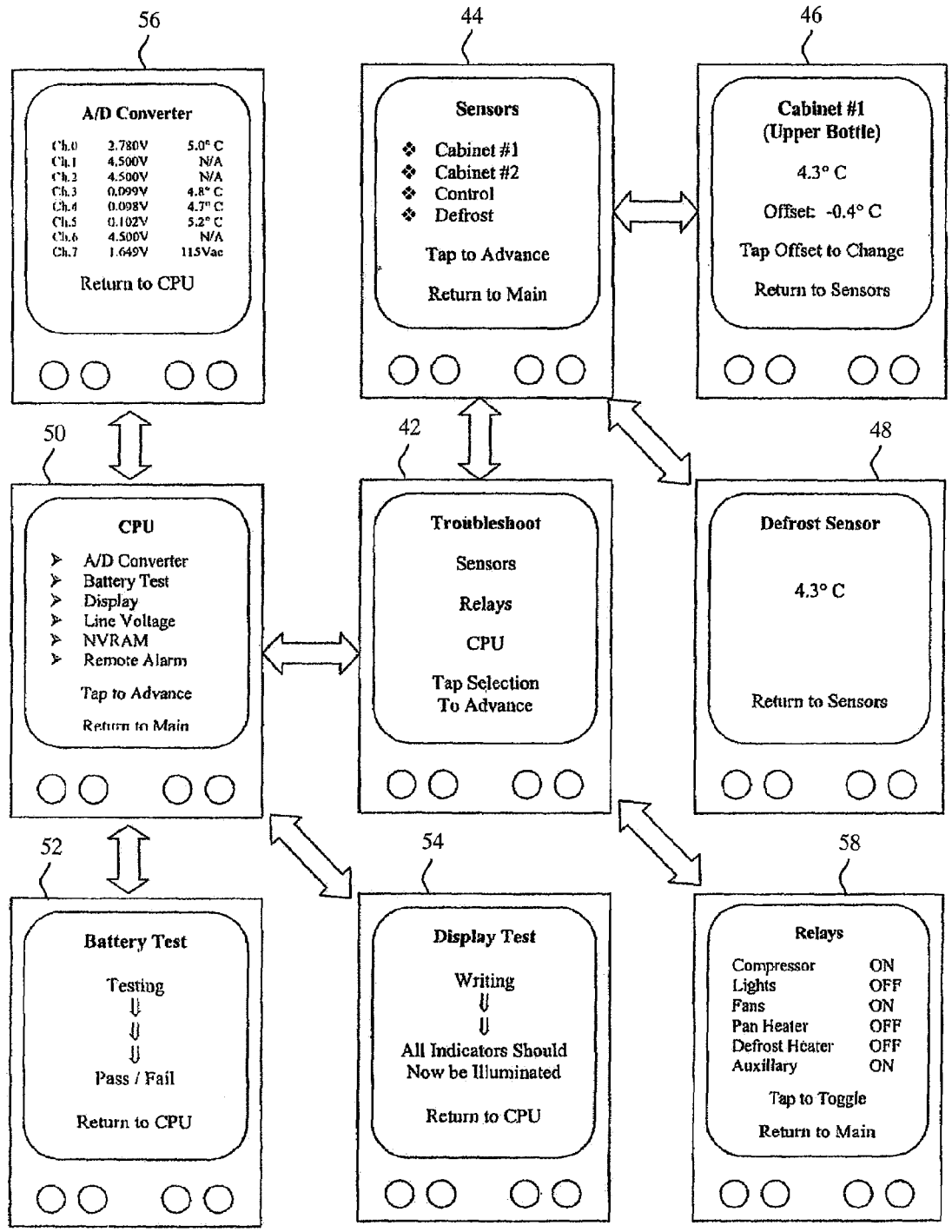
FIG. 4 is a flowchart illustrating the various menus within a remote digital assistant to access and execute the diagnostic capabilities of the present invention.

FIG. 4 is a flowchart illustrating the various menus within a remote digital assistant that enables a user to access and execute the diagnostic tests of the present invention. A user would see these menus when using a PDA 20 to access the diagnostic tests. The central menu 42 is essentially the main menu. Through the central menu 42, the user has the option to troubleshoot sensors, relays or CPU functions. For each of these options, the processor 14 executes software code that is resident in the memory 12. At the selection of the one of the options, the processor 14 executes that portion of the code pertaining to the option. For example, if the user chooses relay switches, then the processor 14 executes the relay switch portion of the software code. If the user chooses sensor, then the process 14 executes the sensor portion of the code.

Selecting the sensor option of the central menu 42 takes the user to the sensor menu 44. In the preferred embodiment, there are up to four sensors monitored by the processor 14. Selecting one of the sensors listed in the sensor menu would then take the user to menu that would display information about that specific menu. If the user selects Cabinet #1, then the user is take to the Cabinet #1 menu 46. If on the other hand, the user selects the defrost menu, then the user is taken to the defrost menu 48. The defrost menu 48 would then display specific information about the defrost sensor.

In the preferred embodiment, selecting the CPU option from the central menu 42 would take the user to the CPU menu 50. Within the CPU menu 50 are more options such as the analog to digital converter, battery test, display, line voltage and the remote alarm. Choosing any one of these options will result in more information being displayed about that option. Selecting the battery test instructs the processor 14 to display the battery test menu 52 and execute the battery test portion of the executable code, which in this case will be to run diagnostic tests on the battery such as the current voltage, capacity test or ability to retain a charge. Selecting the display test instructs the processor 14 to display the display test menu 54 and execute the display portion of the executable code.

Selecting the analog to digital converter from the CPU menu 50 displays the analog to digital converter menu 56. This menu executes that portion of the firmware that obtains actual voltage values for various devices within the equipment 24. Additionally, the processor 14 reports back to the user the calculated temperature based on the conversion of the measured voltage.

Selecting the relay option from the central menu 42 advances the user to the relay menu 58. The relay menu 58 displays the various relays present within the equipment 24 and their current status. The processor 14 is able to report this data to the user by executing the relay portion of the executable code.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus, comprising:
  a storage device wherein data and executable diagnostic tests related to the apparatus are stored and available for retrieval, wherein the executable diagnostic tests relate to mechanical operating conditions of the apparatus at the time the executable diagnostic test is executed, the executable diagnostic tests ascertaining mechanical operating conditions of portions of the apparatus through at least one sensor in said apparatus at the time the executable diagnostic test is executed, the data stored being accessible through a plurality of levels of security;
  a processor that is linked to the storage device, and the devices of the apparatus, the processor controlling the operation of the apparatus and retrieving information of the apparatus;
  a remote receiver linked to the processor wherein the remote receiver receives a request to access the storage device, wherein the request is retrieving informational data concerning the apparatus and executing a diagnostic test to determine specific operating conditions of the apparatus at the time the request is made and the executable diagnostic test is executed; and
  a remote transmitter communicating with the processor,
  a plurality of sensors and controlling devices communicating with the processor, the processor controlling the operation of the apparatus by maintaining the desired refrigeration levels in an ultra low temperature environment and determining the operating conditions through the sensors and controlling devices.

2. The apparatus as in claim 1, further comprising the sensor monitoring the voltage of the sensor and control and status of controlling devices on the compressor, lights, fans, pan heater and defrost heater of the apparatus, wherein the storage device is non-volatile memory.

3. The apparatus as in claim 1, wherein the data is secured to the storage device by restricting accessing to the storage device, and being without security for the manufacturer number, serial number and voltage rating, and the processor being configurable to troubleshoot sensors and relays connected to the processor and processor functions.

4. The apparatus as in claim 3, wherein the data is secured by assigning read and write privileges, with only read privileges for users and read and write only for administrators, and a selection of an analog to digital converter connected to the processor to execute a portion of a firmware that obtains voltage values for the devices in the apparatus.

5. The apparatus as in claim 1, wherein the informational data is operational parameters of the apparatus, and within a selectable processor menu, selecting any one of an analog to digital converter status, battery test, display, line voltage and remote alarm to be executed by the processor.

6. The apparatus as in claim 1, wherein the informational data is manufacturing data related to the apparatus.

7. The apparatus as in claim 1, wherein the remote receiver is an infrared detector.

8. The apparatus as in claim 1, wherein the remote transmitter is an infrared transmitter.

9. The apparatus as in claim 1, wherein the remote receiver is a BLUETOOTH™ detector.

10. The apparatus as in claim 1, wherein the remote transmitter is a BLUETOOTH™ transmitter.

11. The apparatus as in claim 1, wherein the apparatus is an ultra-low temperature freezer.

12. The apparatus as in claim 1, wherein the apparatus is an incubator.

13. The apparatus as in claim 1 wherein the executable diagnostic test is executed when the request is received by the remote receiver.

14. A method for remotely accessing and retrieving data from an apparatus, comprising:
  processing an electrical signal received for access to a storage device, wherein the storage device is linked to the apparatus;
  determining whether the electrical signal received is for a request for informational data or to executing a diagnostic test;
  in response to the request for informational data, permitting access to the storage device such that the information data is retrievable;
  transmitting the informational data to a remote location;
  in response to the request to initiate the diagnostic test, executing the diagnostic test on the apparatus in order to determine an operating condition of the apparatus at the time the request is made, the diagnostic test being performed on mechanical parts of the apparatus to determine the operating condition at the time the request is made and the executable diagnostic test is executed, a processor controlling both the operation of the apparatus and retrieving information of the apparatus for remote access;
  transmitting the results of the diagnostic test to a remote location;
  remotely transmitting the data; and
  controlling, by the controller, the operation of the apparatus by maintaining the desired refrigeration levels in an ultra low temperature environment of the apparatus and determining the operating conditions through the sensors and controlling devices communicating with the processor.

15. The method as in claim 14, further comprising processing a store signal to store data on the storage device from a requestor, and a plurality of remotely selectable menus for controlling the processor, analog to digital converter, a plurality of sensors, and a plurality of relays in the operation of the apparatus and obtaining the current status of the apparatus and predetermined information of the apparatus.

16. The method as in claim 15, further comprising determining whether the requestor has privileges to store data on the storage device.

17. The method as in claim 16, further comprising storing the data on the storage device linked to the apparatus, when the requestor has privileges to write data to the storage device.

18. The method as in claim 17, further comprising securing the data stored on the storage device.

19. The method as in claim 17, wherein the data is secured by granting read and write privileges to the storage device.

20. The method as in claim 14, further comprising linking the storage device to a remote location.

21. The method as in claim 20, further comprising accessing the data from the remote location through wireless communication.

22. The method as in claim 21, further comprising storing the data at the remote location.

23. The method as in claim 14, wherein the sensor monitoring the voltage of the sensor and control and status of controlling devices on the compressor, lights, fans, pan heater and defrost heater of the apparatus, wherein the diagnostic test is executed when the request is received by a remote receiver communicating with the apparatus.

24. A system for remotely accessing and retrieving data from an apparatus with a plurality of physical components, comprising:
    means for processing an electrical signal received for access to a means for storing, wherein the means for storing is linked to the apparatus;
    means for determining whether the signal received is for a request for informational data or to execute a diagnostic test;
    in response to the request for informational data, means for permitting access to the means for storing such that the information data is retrievable;
    means for transmitting the informational data to a remote location;
    in response to the request to initiate the diagnostic test of the plurality of physical components of the apparatus, means for executing the diagnostic test on the apparatus in order to determine an operating condition of the system at the time the request is made and controlling an operation of the apparatus, the diagnostic test stored on a medium with restricted access as to privilege depending on the user;
    means for transmitting the results of the diagnostic test to a remote location;
    means for remotely transmitting the data; and
    a plurality of sensor means and controlling means communicating with the processor, the processor controlling the operation of the apparatus by maintaining the desired refrigeration levels in an ultra low temperature environment and determining the operating conditions through the sensor means and controlling means.

25. The apparatus as in claim 24, further comprising means for securing the data stored on the means for storing, and the operation of the apparatus including maintaining a certain temperature of the apparatus.

26. The apparatus as in claim 25, wherein the data is secured by a means for granting read and write privileges to the means for storing data.

27. The apparatus as in claim 24, further comprising means for storing data upon the reception of a remote storage signal.

28. The apparatus as in claim 24, further comprising means for linking the means for storing to a remote location.

29. The apparatus as in claim 28, further comprising means for accessing the data from the remote location.

30. The apparatus as in claim 29, further comprising remote means storing the data at the remote location.

* * * * *